(12) United States Patent
Lai et al.

(10) Patent No.: US 11,992,961 B2
(45) Date of Patent: May 28, 2024

(54) POSE DETERMINATION METHOD, ROBOT USING THE SAME, AND COMPUTER READABLE STORAGE MEDIUM

(71) Applicant: UBTECH ROBOTICS CORP LTD, Shenzhen (CN)

(72) Inventors: Youfang Lai, Shenzhen (CN); Zhichao Liu, Shenzhen (CN); Mingqiang Huang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 223 days.

(21) Appl. No.: 17/483,837

(22) Filed: Sep. 24, 2021

(65) Prior Publication Data

US 2022/0152835 A1    May 19, 2022

Related U.S. Application Data (63) Continuation of application No. PCT/CN2020/140559, filed on Dec. 29, 2020.

(30) Foreign Application Priority Data

Nov. 17, 2020    (CN) .......................... 202011287700.5

(51) Int. Cl.
    *B25J 9/16*    (2006.01)
    *B25J 13/08*   (2006.01)

(52) U.S. Cl.
    CPC ........... *B25J 9/1697* (2013.01); *B25J 9/1653* (2013.01); *B25J 13/089* (2013.01)

(58) Field of Classification Search
    CPC ...... B25J 9/1697; B25J 9/1653; B25J 13/089; B25J 9/1694; G05B 2219/40298
    See application file for complete search history.

(56) References Cited

U.S. PATENT DOCUMENTS

| | | | |
|---|---|---|---|
| 2007/0069026 A1* | 3/2007 | Aoyama | G06K 7/1456 235/462.09 |
| 2019/0208979 A1* | 7/2019 | Bassa | A47L 11/4044 |

(Continued)

FOREIGN PATENT DOCUMENTS

| CN | 110308729 A | 10/2019 |
|---|---|---|
| CN | 110726406 A | 1/2020 |
| CN | 111511017 A | 8/2020 |

OTHER PUBLICATIONS

ISR for PCT/CN2020/140559.
Written opinions of ISA for PCT/CN2020/140559.

*Primary Examiner* — Jonathan L Sample
*Assistant Examiner* — Mohammed Yousef Abuelhawa (57) ABSTRACT

A pose determination method and a robot using the same are provided. The method includes: obtaining a two-dimensional code image collected by the camera of the robot and sensor data collected by the sensor of the robot, and determining mileage information of the robot within a predetermined duration, where the sensor data includes an acceleration and an angular velocity, determining a first pose of the camera based on two-dimensional code information recognized from the two-dimensional code image and a pose estimation function, and determining a second pose of the sensor based on the sensor data; obtaining a third pose by performing a tight coupling optimization based on the first pose and the second pose; and obtaining the pose of the robot by fusing the third pose and the mileage information. In such a manner, the accuracy of determining the pose of the robot in a complex scene can be improved.

20 Claims, 6 Drawing Sheets

(56) References Cited

U.S. PATENT DOCUMENTS

2020/0050208 A1* 2/2020 Frick .................... G05D 1/0061
2022/0088782 A1* 3/2022 Liu ....................... B65G 1/137

* cited by examiner

FIG. 6

POSE DETERMINATION METHOD, ROBOT USING THE SAME, AND COMPUTER READABLE STORAGE MEDIUM

CROSS REFERENCE TO RELATED APPLICATIONS

The present disclosure is a continuation-application of International Application PCT/CN2020/140559, with an international filing date of Dec. 29, 2020, which claims foreign priority of Chinese Patent Application No. 202011287700.5, filed on Nov. 17, 2020 in the State Intellectual Property Office of China, the contents of all of which are hereby incorporated by reference.

BACKGROUND

1. Technical Field

The present disclosure relates to robot technology, and particularly to a pose determination method, a robot using the same, and a computer readable storage medium.

2. Description of Related Art

When a robot executes tasks autonomously, to obtain the accurate motion postures of the robot itself is essential for guaranteeing the quality of its autonomous executed tasks. However, at present, mobile robots that use visual positioning to build maps are susceptible to the affections of the change in lighting, crowds, and the like in complex scenes (e.g., stages), which can easily lead to loss of positioning or inaccurate positioning.

Therefore, the current positioning methods of robots are generally difficult to adapt to the complex scenes that have complex light, multiple dynamic objects, and the like, which results in the low accuracy of determining the pose of the robot in the complex scenes.

The above-mentioned contents are only for assisting the understanding of the technical solutions of the present disclosure, and does not mean that all the above-mentioned contents are recognized as prior art.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be noted that, the drawings in the following description merely show some embodiments. For those skilled in the art, other drawings may be obtained according to the drawings without creative efforts.

DETAILED DESCRIPTION

In order to make the objectives, technical solutions, and advantages of the present disclosure clearer, the following further describes the present disclosure in detail with reference to the drawings and embodiments. It should be understood that, the embodiments described herein are only for explaining the present disclosure, and are not used to limit thereto.

Figure 1:
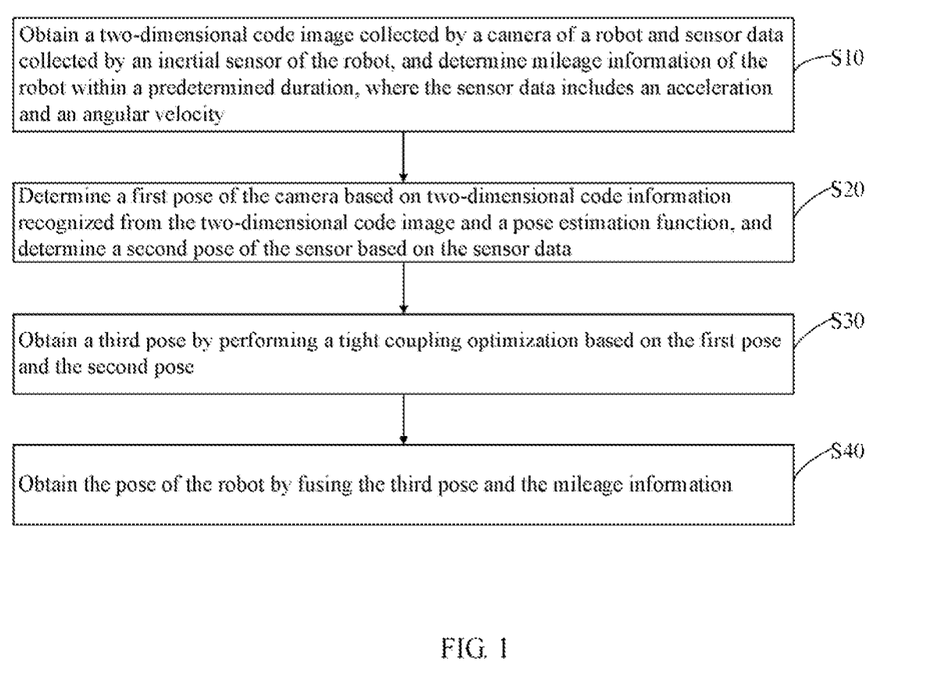
FIG. 1 is a flow chart of a robot pose determination method according to an embodiment of the present disclosure.

FIG. 1 is a flow chart of a robot pose determination method according to an embodiment of the present disclosure. In this embodiment, the robot pose determination method is a computer-implemented method executable for a processor, which may be applied to a robot. The robot has a camera and an inertial sensor. The method may be implemented through a robot pose determination apparatus shown in FIG. 5 or a robot shown in FIG. 6. As shown in FIG. 1, the method may include the following steps.

S10: obtaining a two-dimensional code image collected by the camera of the robot and sensor data collected by the inertial sensor of the robot, and determining mileage information of the robot within a predetermined duration, where the sensor data includes an acceleration and an angular velocity;

S20: determining a first pose of the camera based on two-dimensional code information recognized from the two-dimensional code image and a pose estimation function, and determining a second pose of the sensor based on the sensor data;

S30: obtaining a third pose by performing a tight coupling optimization based on the first pose and the second pose; and S40: obtaining the pose of the robot by fusing the third pose and the mileage information.

In one embodiment, the robot may be a wheeled robot or a biped robot, and the robot may include one or more other physical user interface devices such as a physical keyboard, mouse, and/or joystick.

As described in step S10, the body of the robot is provided with the camera and the inertial sensor, where the inertial sensor may be an IMU (inertial measurement unit) sensor. The IMU sensor is a device for measuring the three-axis attitude angle (or angular velocity) and acceleration of an object (i.e., the robot).

In general, an IMU contains three single-axis accelerometers and three single-axis gyroscopes. The accelerometer detects the acceleration signal of the object in the independent three-axis of the carrier coordinate system, and the gyroscope detects the angular velocity signal of the carrier relative to the navigation coordinate system. Based on the signals, the angular velocity and acceleration of the object in the three-dimensional (3D) space can be measured.

In one embodiment, during the operation of the robot, images in the operating space of the robot may be collected through the camera, and sensor data of the robot may be collected through the inertial sensor. In which, the sensor data may include an acceleration and an angular velocity.

In one embodiment, the robot obtains the images collected by the camera within a predetermined duration and the sensor data collected by the inertial sensor within the predetermined duration. In which, the preset duration may be set to, for example, 30 seconds or 1 minute according to actual needs.

It should be understood that, within the predetermined duration, the robot may continuously move or rotate, and stop during the period.

In one embodiment, a plurality of two-dimensional codes may be arranged in advance in the operating space of the robot in a random manner or according to a certain rule, and the two-dimensional codes are different, and each two-dimensional code has a unique identification value associated with its two-dimensional code information. When the robot collects images through the camera, the image among the collected images that has at least one two-dimensional code may be used as the two-dimensional code image.

In one embodiment, the robot identifies a plurality of different two-dimensional codes from at least one frame of two-dimensional code image that is collected by the camera within the predetermined duration, and further extracts the four corner pixels of each two-dimensional code as two-dimensional code information. As an example, the two-dimensional code information corresponding to the two-dimensional code may further include an identification value corresponding to the two-dimensional code.

Furthermore, in order to distinguish the four corner pixels of the two-dimensional code, each corner pixel may also be assigned a corresponding unique identifier.

In one embodiment, when the robot is a wheeled robot, which may be installed with wheeled odometers, and the robot may use the wheeled odometers to record relative information (e.g., the rotational speed of wheel axis) within the predetermined duration to determine the mileage information of the robot within the predetermined duration. In which, by installing the wheel odometers on the wheels on both sides of the robot, when the robot moves, the wheel odometers can record the rotational speeds of the wheels of the robot, thereby calculating the distance traveled by the wheels using the wheel circumference recorded in advance. In addition, by comparing the travel distance of the wheels on the left and right sides, the traveling direction of the robot may be obtained. Furthermore, based on the conversion relationship of the ratio of the travel distances of the wheels on both sides and the rotation angle, the rotation angle of the robot when turning may be further obtained. For example, if the travel distance of the wheel on the left is larger than that on the right, it determines that the robot is turning right; if it is detected that the travel distances of the wheels on both sides are equal, it determines that the robot is traveling straight; and if the travel distance of the wheel on the right is larger than that of the left, it determines that the robot is turning left. Based on the operating principle of the above-mentioned wheel odometer, the mileage information of the robot may be obtained.

In one embodiment, if the robot is a biped robot, the robot may calculate the mileage information of the robot within the predetermined duration using positive kinematics by collecting the variables of each joint of the robot within the predetermined duration. It should be noted that, in robot kinematics, positive kinematics refers to the method of calculating the position and posture of the robot using the known variables of each joint of the robot.

In which, the mileage information includes the mileage, acceleration and speed of the robot. On the basis of the mileage, acceleration and speed, the position and posture (referred to as the pose, which may be denoted as the fifth pose) of the robot may be further estimated, that is, the mileage information at least includes the fifth pose. It can be understood that, in this embodiment, since the pose of the robot that is generally estimated using the mileage information is easily affected by the terrain of the place where the robot is positioned and has errors, the fifth pose will not be directly used as the final determined pose of the robot.

It should be noted that, the pose of the robot refers to the position of the robot and the orientation of the robot at that position. At this time, the orientation of the robot may be relative to a local coordinate system (or a world coordinate system).

The local coordinate system takes the center of the object as the coordinate origin. The rotation, the translation, and other movement of the object are all performed based on the local coordinate system while the world coordinate system uses the marker as the world coordinate plane, and the coordinate origin is defined as the coordinate system of a certain point of the marker. The world coordinate system and the local coordinate system may usually be transformed into each other through the corresponding matrix transformation.

As described in step S20: after the robot obtains the two-dimensional code information, the first pose (or called the first mileage information) of the camera in the camera coordinate system (i.e., the local coordinate system of the camera) may be calculate based on the two-dimensional code information and the pose estimation function (e.g., the solvePnP function in OpenCV), and the first pose may be converted to the IMU coordinate system (i.e., the local coordinate system of the IMU).

It should be noted that, based on the relative position relationship between the camera and the IMU sensor, a conversion relationship between the local coordinate systems of the two may be established. Based on the conversion relationship, the poses in the local coordinate systems may be mutually converted. Since the camera and the IMU sensor are both installed on the robot, the relative position between the two may be determined when the robot is constructed, and the relative position between the two may be saved in the database of the robot.

In one embodiment, the first pose $r_C$ may be calculated through an equation of:

$$r_C(\hat{z}_l^{C_j}, X) = \left( \hat{P}_l^{C_j} - \frac{P_l^{C_j}}{\|P_l^{C_j}\|} \right);$$

where, P represents the coordinates of the feature points (i.e., the pixel points corresponding to the corner points of the two-dimensional code) in the normalized camera coordinate system, and (u, s) are the coordinate values of the feature points, hence $$\hat{P}_l^{C_j} = \pi_C^{-1}\left( \begin{bmatrix} \hat{u}_l^{C_j} \\ \hat{s}_l^{C_j} \end{bmatrix} \right)$$

represents the coordinates of the corner points of the l-th two-dimensional code that are observed by the j-th camera in the normalized camera coordinate system;

$$\frac{P_l^{C_j}}{\|P_l^{C_j}\|}$$

represents the coordinates of the corner points of the two-dimensional code in the normalized camera coordinate system; $P_l^{C_j}$ is the estimated possible coordinates of the corner points of the l-th two-dimensional code in the normalized camera coordinate system of the j-th camera; and C is the amount of the image samples. In which, the coordinates in the camera coordinate system may be converted to the IMU coordinate system first, so that the finally obtained first pose refers to the IMU coordinate system.

In one embodiment, after the sensor data is obtained, the robot may perform integration operations based on the sensor data to calculate the second pose (or referred to as the second mileage information) of the IMU sensor in the IMU coordinate system (i.e., the local coordinate system of the IMU). The second pose $r_B$ may be calculated through an equation of:

$$r_B(\hat{z}_{b_{k-1}}^{b_k}, X) = \begin{bmatrix} \delta\alpha_{b_{k-1}}^{b_k} \\ \delta\beta_{b_{k-1}}^{b_k} \\ \delta\theta_{b_{k-1}}^{b_k} \\ \delta b_a \\ \delta b_g \end{bmatrix} = \begin{bmatrix} R_\omega^{b_k}(p_{b_{k-1}}^\omega - p_{b_k}^\omega + \frac{1}{2}g^\omega \Delta t_k^2 - v_{b_k}^\omega \Delta t_k) - \hat{\alpha}_{b_{k-1}}^{b_k} \\ R_\omega^{b_k}(v_{b_{k-1}}^\omega + g^\omega \Delta t_k - v_{b_k}^\omega) - \hat{\beta}_{b_{k-1}}^{b_k} \\ 2[q_{b_k}^{\omega-1} \times q_{b_{k-1}}^\omega \times (\hat{\gamma}_{b_{k-1}}^{b_k})^{-1}]_{xyz} \\ b_{a b_{k-1}} - b_{a b_k} \\ b_{\omega b_{k-1}} - b_{\omega b_k} \end{bmatrix}$$

where, α, β, and γ are the IMU pre-integrated quantities, which can be expressed in the discrete form of the Euler method as:

$$\hat{\alpha}_{i+1}^{b_k} = \hat{\alpha}_i^{b_k} + \hat{\beta}_i^{b_k} \delta t + \frac{1}{2} R(\hat{\gamma}_i^{b_k})(\hat{a}_i - b_{a_i})\delta t^2$$

$$\hat{\beta}_{i+1}^{b_k} = \hat{\beta}_i^{b_k} + R(\hat{\gamma}_i^{b_k})(\hat{a}_i - b_{a_i})\delta t$$

$$\hat{\gamma}_{i+1}^{b_k} = \hat{\gamma}_i^{b_k} \otimes \hat{\gamma}_{i+1}^i = \hat{\gamma}_i^{b_k} \otimes \begin{bmatrix} 1 \\ \frac{1}{2}(\hat{\omega}_i - b_{\omega_i})\delta t \end{bmatrix}.$$

Furthermore, in the equation for calculating the second pose, θ is the rotation angle, δt is the time interval of the IMU frames, a and ω are the acceleration and the angular velocity output by the IMU, respectively, $b_a$ and $b_g$ represent the deviations of the gyroscope and the accelerometer in the IMU, respectively, R is the rotation matrix, p is the displacement vector, v is the velocity vector, q is the quaternion rotation, g is the gravity vector, and B is the measurement data set of the IMU.

As described in step S30: the tight coupling optimization is performed on an objective function using the least square method, which may minimize the objective function. In which, the objective function is the combination of the first pose and the second pose.

In one embodiment, after obtaining the first pose and the second pose, the robot uses the least square method to perform the tight coupling optimization on the objective function to obtain the third pose. The third pose $r_A$ may be calculated through an equation of:

$$r_A = \min_X \left\{ \sum_{k \in B} \|r_B(\hat{z}_{b_{k-1}}^{b_k}, X)\|_{Q_{b_{k-1}}^{b_k}}^2 + \sum_{(l,j) \in C} \|r_C(\hat{z}_l^{C_j}, X)\|_{Q_l^{C_j}}^2 \right\};$$

where, $Q_{b_{k-1}}^{b_k}$ the covariance of the pre-integrated noise term, and $Q_l^{C_j}$ is the noise covariance.

In this way, it is equivalent to using the first pose and the second pose as two residuals, the first pose and the second pose are fitted using the least squares method, the optimal value is iteratively solved, and the optimal value is taken as the third pose.

In one embodiment, the first pose may also be relative to the local coordinate system of the camera, and before the first pose and the second pose are fused, both the first pose and the second pose are converted to the same world coordinate system, and the first pose and the second pose in the world coordinate system are fused to obtain the third pose of the reference world coordinate system.

As described in step S40, after the third pose and the mileage information are obtained, the robot may adopt a filtering processing method which uses the mileage information as the observed quantity and the third pose as the state quantity to correct the state quantity using the observed quantity, thereby fusing the third pose and the mileage information, and the third pose corrected based on the mileage information is obtained to take as the finally determined pose of the robot (which can be denoted as the sixth pose).

In which, in the case that the third pose refers to the IMU coordinate system, the fifth pose corresponding to the mileage information is first converted from its original local coordinate system to the IMU coordinate system, then the third pose and the fifth pose in the IMU coordinate system are fused to obtain the robot pose that refers to the IMU coordinate system. In the case that the third pose refers to the world coordinate system, the fifth pose corresponding to the mileage information is first converted from its original local coordinate system to the world coordinate system, then the third pose and the fifth pose in the world coordinate system are fused to obtain the robot pose that refers to the world coordinate system.

In one embodiment, the camera is used to estimate the pose of the robot, and the estimated pose is gradually fused with the fused inertial sensor data and the mileage information to continuously correct the pose of the robot, so that even when in the complex scenes which has complex light and multi dynamic objects, the accurate pose of the robot can still be obtained, thereby improving the accuracy of determining the pose of the robot in the complex scenes.

Figure 2:
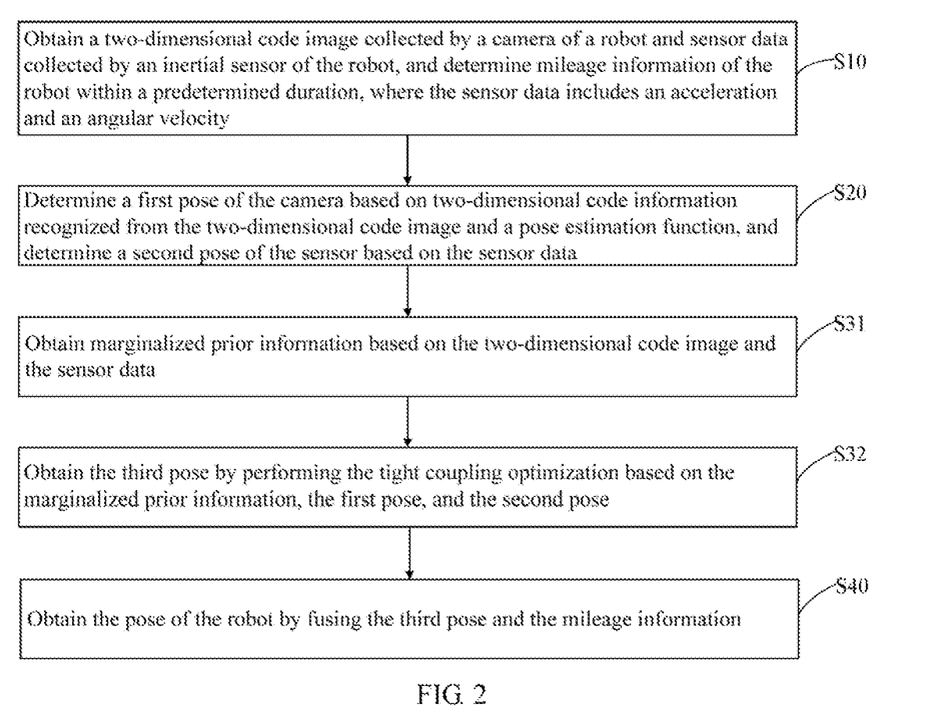
FIG. 2 is a flow chart of a robot pose determination method according to another embodiment of the present disclosure.

FIG. 2 is a flow chart of a robot pose determination method according to another embodiment of the present disclosure. In one embodiment, as shown in FIG. 2, based on the embodiment shown in FIG. 1, the obtaining the third pose by performing the tight coupling optimization based on the first pose and the second pose include:

S31: obtaining marginalized prior information based on the two-dimensional code image and the sensor data, and S32: obtaining the third pose by performing the tight coupling optimization based on the marginalized prior information, the first pose, and the second pose.

In this embodiment, the complete state vector in a sliding window may be defined as:

$$X = [x_0, \ldots, x_n, x_C^b, \lambda_0, \ldots, \lambda_m];$$

$$x_k = [p_{b_k}^\omega, v_{b_k}^\omega, q_{b_k}^\omega, b_a, b_g], k \in [0, n]; \text{ and}$$

$$x_C^b = [p_C^b, q_C^b];$$

where, X is the system state vector, and $x_k$ is the IMU data collected when the camera captures the two-dimensional code image (i.e., the sensor data corresponding to each frame of the two-dimensional code image) which includes the position, speed and direction of the IMU in the world coordinate system as well as the accelerometer bias and gyroscope bias in the IMU coordinate system, n is the total number of key frames, m is the total number of the features in the sliding window, and λ is the inverse depth of the observed feature.

In one embodiment, $x_k$ and feature point λ are selectively marginalized from the sliding window, and the measured value corresponding to the edge state is converted into the marginalized prior information of $\{r_e, J_e\}$. In this way, the process of obtaining the marginalized prior information is equivalent to obtaining the marginalized prior information by marginalizing the prior information obtained based on the two-dimensional code image and the IMU data corresponding to the two-dimensional code image. In which, the marginalization is performed using a Schur complement algorithm.

After the marginalized prior information, the first pose, and the second pose are obtained, the robot obtains the third pose $r_A$ by performing the tight coupling optimization on the marginalized prior information, the first pose and the second pose using the least square method. The third pose $r_A$ may be calculated through an equation of.

$$r_A = \min_X \left\{ \|r_e - J_e X\|^2 + \sum_{k \in B} \left\| r_B\left(\hat{z}_{b_{k-1}}^{b_k}, X\right) \right\|^2_{Q_{b_{k-1}}^{b_k}} + \sum_{(l,j) \in C} \left\| r_C\left(\hat{z}_l^{C_j}, X\right) \right\|^2_{Q_l^{C_j}} \right\}$$

In this way, by adding the marginalized prior information to the fusion of the first pose and the second pose, the accuracy of the third pose obtained based thereon can be improved.

Figure 3:
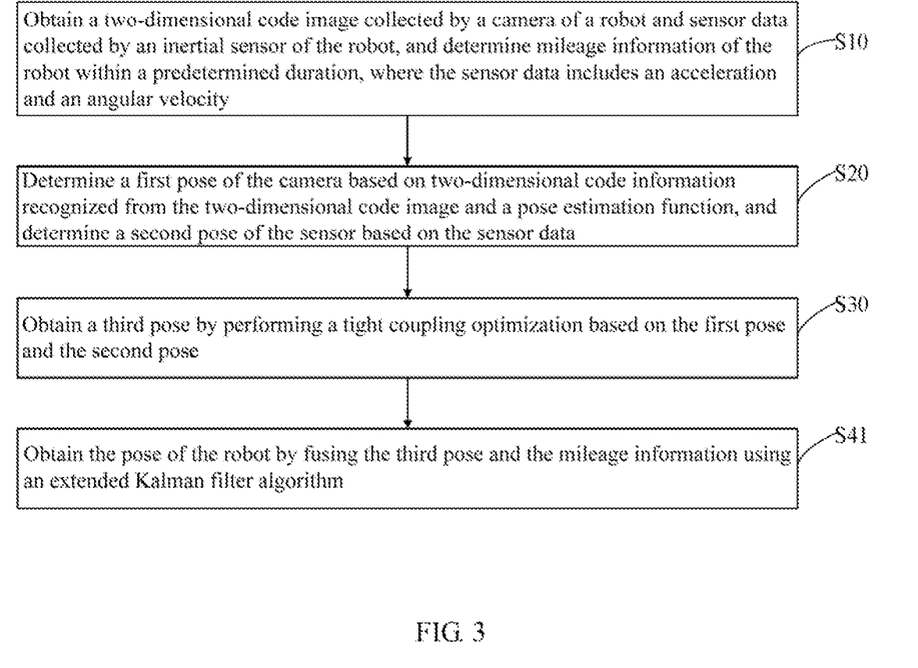
FIG. 3 is a flow chart of a robot pose determination method according to still another embodiment of the present disclosure.

FIG. 3 is a flow chart of a robot pose determination method according to still another embodiment of the present disclosure. In one embodiment, as shown in FIG. 3, on the basis of the above-mentioned embodiments of FIG. 1-FIG. 2, the obtaining the pose of the robot by fusing the third pose and the mileage information include:

S41: obtaining the pose of the robot by fusing the third pose and the mileage information using an extended Kalman filter algorithm.

In this embodiment, after obtaining the third pose and the mileage information, the robot may use an extended Kalman filter (EKF) algorithm to fuse the third pose and the mileage information. The extended Kalman filter algorithm is an extended form of the standard Kalman filter in non-linear cases, which is a high-efficiency recursive filter (autoregressive filter). The basic idea of EKF is to use Taylor series expansion to linearize the nonlinear system, and then use a Kalman filter framework to filter the signals.

In one embodiment, an EKF filter may be installed on the robot. The robot may input the third pose and the mileage information into the EKF filter for fusion, and obtain the sixth pose outputted by the EKF filter after data processing to take as the final determined pose of the robot. It should be noted that, the EKF filter may fuse data input by a plurality of sensors, where the third pose and the mileage information may be taken as the data input to the EKF filter from different sensors.

During fusing the third pose and the mileage information using the EKF filter, the robot uses the third pose and the mileage information as the initial reference values of the local coordinate system for data initialization.

In one embodiment, since the third pose and the mileage information are determined based on the data collected within the predetermined duration, there can be a plurality of third poses and the mileage information within the predetermined duration, that is, the third pose and the mileage information corresponding to each moment in the predetermined duration may be different. Moreover, in EKF, the data at the previous moment is defined as the measured value, and the data at the current moment is defined as the predicted value (or the estimated value). Therefore, in the local coordinate system constructed based on the third pose and the mileage information, the first covariance matrix of the third pose at the current moment relative to the third pose at the previous moment is determined, and the second covariance matrix of the mileage information at the current moment relative to the mileage information at the previous moment is determined.

Furthermore, the robot further inputs the IMU sensor data into the EKF filter, uses the sensor data as the actual measured value, then combines the third pose at the previous moment, the mileage information at the previous moment, and the first covariance matrix, and the second covariance matrix to use as the reference value to input into the fusion calculation of the EKF filter algorithm. Finally, the estimated value of the robot in the IMU coordinate system at the current moment is obtained to generate the pose of the robot (which may be denoted as the sixth pose). It should be noted that, the sixth pose may also be converted into the world coordinate system.

It should be noted that, during the fusion calculation, the involved state transition equation, observation equation, and fusion algorithm (including Taylor expansion) of the EKF filter algorithm may use the related equations provided by the traditional EKF filter algorithm, or the equations of the variants of other EKF filter algorithms, which is not limited herein.

In this way, by fusing of the third pose and the mileage information of the robot within the predetermined duration based on the extended Kalman filter algorithm, the final obtained accuracy of the pose of the robot can be improved.

Figure 4:
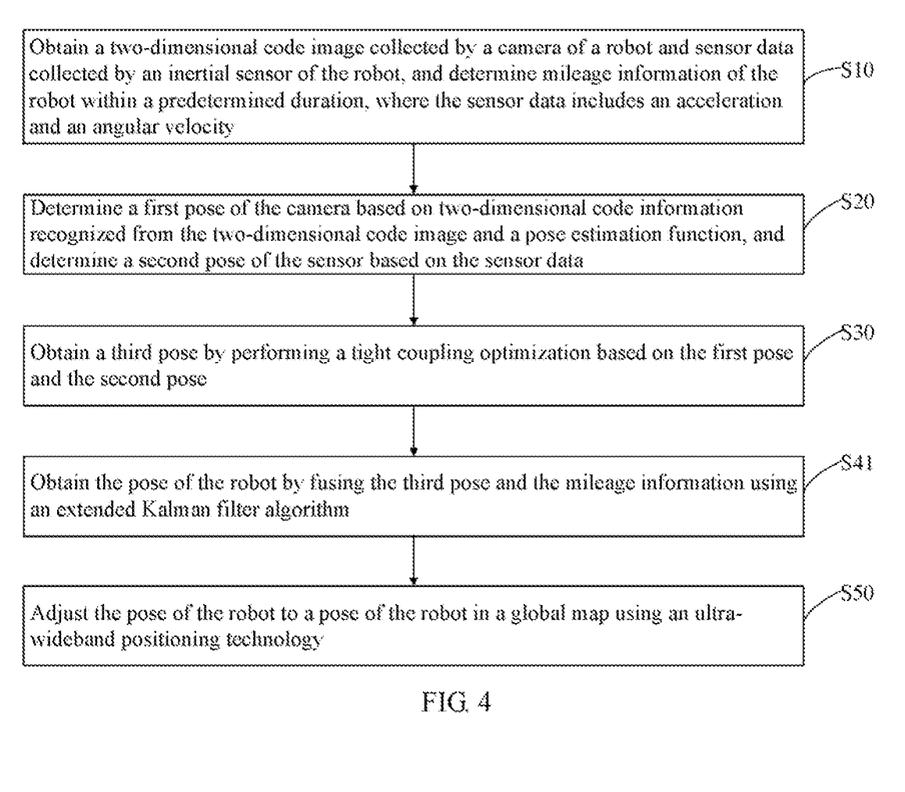
FIG. 4 is a flow chart of a robot pose determination method according to the other embodiment of the present disclosure.

FIG. 4 is a flow chart of a robot pose determination method according to the other embodiment of the present disclosure. In one embodiment, as shown in FIG. 4, on the basis of the above-mentioned embodiments in FIG. 1-FIG. 3, after the obtaining the pose of the robot by fusing the third pose and the mileage information using an extended Kalman filter algorithm, further includes:

S50: adjusting the pose of the robot to a pose of the robot in a global map using an ultra-wideband positioning technology.

In this embodiment, the robot may be installed with an ultra-wideband (UWB) positioning module, and a plurality of base stations that can communicate with the UWB positioning module may be disposed in the working space of the robot in advance.

In one embodiment, the robot may perform communication ranging with the plurality of base stations through the UWB module, and obtain the ranging value by performing wireless ranging with at least three base stations respectively so as to perform indoor positioning on the robot, thereby obtaining the coordinates of the robot in the global coordinate system.

It should be noted that, the global coordinate system is the coordinate system where the 3D space object is located, and the vertex coordinates of the model are expressed based on this coordinate system. However, the local coordinate system is an imaginary coordinate system, and the relative position of the coordinate system and the object is unchanged from beginning to end. The purpose of imagining this coordinate system is mainly for the positive understanding of the translation and rotation movements performed on the object in the 3D scene. It should be understood that, in the case that the reference object of the world coordinate system is consistent with that of the global coordinate system, the world coordinate system may be equal to the global coordinate system, that is, there is a possibility that the world coordinate system is equal to the global coordinate system.

In one embodiment, based on the coordinates of the robot in the global coordinate system, combing with the previously obtained pose of the robot in the IMU coordinate system, the pose of the robot in the global coordinate system may be obtained. Since the pose of the robot in the IMU coordinate system includes the orientation and the coordinates, although the coordinates in the IMU coordinate system (denoted as the first coordinates) and that in the global coordinate system (denoted as the second coordinates) are different in their forms, the two coordinates point to the same position in the real world. Therefore, by establishing the first correspondence between the coordinates in the IMU coordinate system and that in the global coordinate system, the robot may adjust the orientation of the robot in the local coordinate system to that in the global coordinate system based on the first correspondence, and combine the second coordinates to obtain the pose of the robot in the global coordinate system.

In one embodiment, the robot may update the EKF filter by taking the second coordinates obtained based on the UWB technology as the global positioning before the EKF filter outputs the pose of the robot, so that the EKF filter can directly output the pose of the robot in the global coordinate system.

In one embodiment, before the robot uses the UWB module to calculate the second coordinates based on a plurality of ranging values, it may estimate the reasonable range of the ranging value at the current moment based on the ranging value of the past historical record (i.e., the record before the preset duration) and the historical second coordinates, then the second coordinate may be calculated using the remaining ranging value after removing the currently detected ranging values that are beyond the reasonable range of the ranging value. In this way, the accuracy of positioning the robot can be improved.

Furthermore, after the pose of the robot in the global coordinate system is obtained, the robot may combine the map of the real world to generate a global map, and display the pose of the robot in the global map. For example, an arrow icon may be used to represent the pose of the robot, and the direction pointed by the arrow is the orientation of the robot.

In this way, by using the UWB positioning technology to adjust the pose of the robot to that in the global map, it will be convenient for the user to intuitively feel the pose of the robot in the real world, thereby improving the user experience.

In on embodiment, on the basis of the foregoing embodiment, after the adjusting the pose of the robot to a pose of the robot in a global map using an ultra-wideband positioning technology, the method further includes:

S60: obtaining a fourth pose of a two-dimensional code corresponding to the two-dimensional code information relative to the first pose; and S61: constructing a global two-dimensional code map by marking the two-dimensional code in the global map based on the fourth pose and the pose of the robot in the global map.

In this embodiment, after the two-dimensional code information is extracted, the robot may calculate the first pose (or called the first mileage information) of the camera in the camera coordinate system (i.e., the local coordinate system of the camera). At the same time, since the pose of the two-dimensional code corresponding to each two-dimensional code information for calculating the first pose is actually opposite to the first pose (i.e., the direction of the first pose is toward the two-dimensional code, and the position of the first pose is determined based on the positions of at least three two-dimensional codes), the robot may reverse the calculation process of the first pose through the relative positional relationship between the two-dimensional code and the camera to determine the pose (denoted as the fourth pose) of the two-dimensional code corresponding to each two-dimensional code information for calculating the first pose relative to the first pose in the camera coordinate. In this embodiment, the robot may further convert the fourth pose into the IMU coordinate system or the world coordinate system.

Furthermore, the robot may establish a second correspondence (including the distance relationship and orientation relationship between the two) between the fourth pose and the first pose. After the pose of the robot in the global map (denoted as the seventh pose) is obtained, the robot may use the seventh pose as the reference point in the global map, and convert the fourth pose to the eighth pose in the global map based on the second correspondence and the first correspondence, and then mark the two-dimensional code corresponding to each eighth pose in the global map, thereby constructing a global two-dimensional code map.

In this way, the accuracy of using the robot positioning to construct the global two-dimensional code map can be improved. Moreover, after the robot goes one round in a scene, the arrangement pose (including the position and orientation) of all the two-dimensional codes in the scene may be displayed on the global two-dimensional code map, and may also save the cost of manually generating the global two-dimensional code map.

In one embodiment, on the basis of the above-mentioned embodiment, the camera is an infrared camera, and the robot includes an infrared fill light. Before the obtaining the two-dimensional code image collected by the camera of the robot and sensor data collected by the sensor of the robot, and determining mileage information of the robot within the predetermined duration, the method may further include:

S70: turning on the infrared fill light in response to detecting that the infrared camera is collecting the two-dimensional code image.

In this embodiment, the camera of the robot is the infrared camera, and the infrared fill light is also installed on the robot. When the robot detects that the infrared camera is collecting images, the infrared fill light is turned on, so as to compensate the infrared camera for infrared illumination during the infrared camera collects the images.

In which, the infrared camera may be a camera that adopts an infrared wave band of 940 nm that is a narrow wave band.

In this way, in the scenes with rapid light changes, the affection of the visible light band for the camera to collect the two-dimensional code image can be avoided, so that more accurate camera poses can be obtained, and the accuracy of the poses of the robot that are generated based on the camera pose can be improved.

Figure 5:
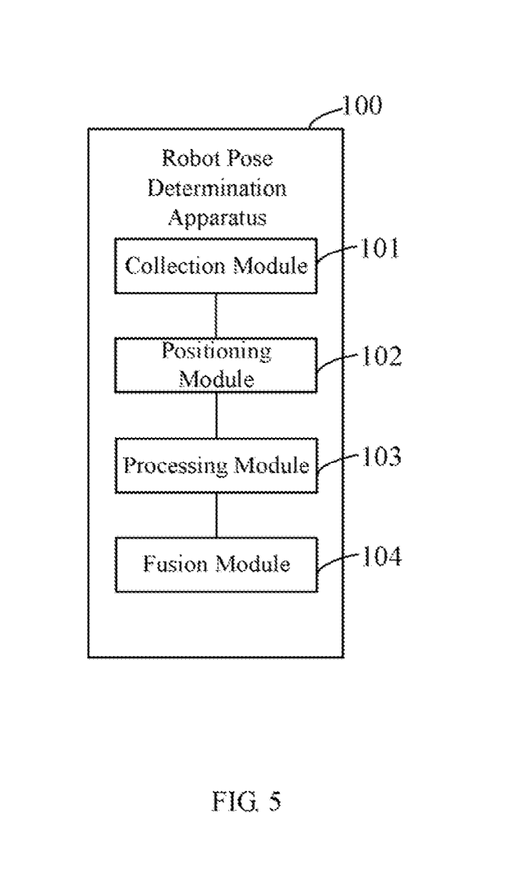
FIG. 5 is a schematic block diagram of a robot pose determination apparatus according to an embodiment of the present disclosure.

FIG. 5 is a schematic block diagram of a robot pose determination apparatus according to an embodiment of the present disclosure. In this embodiment, a robot pose determination apparatus 100 is provided, which may be applied to a robot shown in FIG. 6. As shown in FIG. 5, the robot pose determination apparatus 100 may include:

a collection module 101 configured to obtain a two-dimensional code image collected by the camera of the robot and sensor data collected by the sensor of the robot, and determining mileage information of the robot within a predetermined duration, wherein the sensor data includes an acceleration and an angular velocity a positioning module 102 configured to determine a first pose of the camera based on two-dimensional code information recognized from the two-dimensional code image and a pose estimation function, and determining a second pose of the sensor based on the sensor data;

a processing module 103 configured to obtain a third pose by performing a tight coupling optimization based on the first pose and the second pose; and a fusion module 104 configured to obtain the pose of the robot by fusing the third pose and the mileage information.

Figure 6:
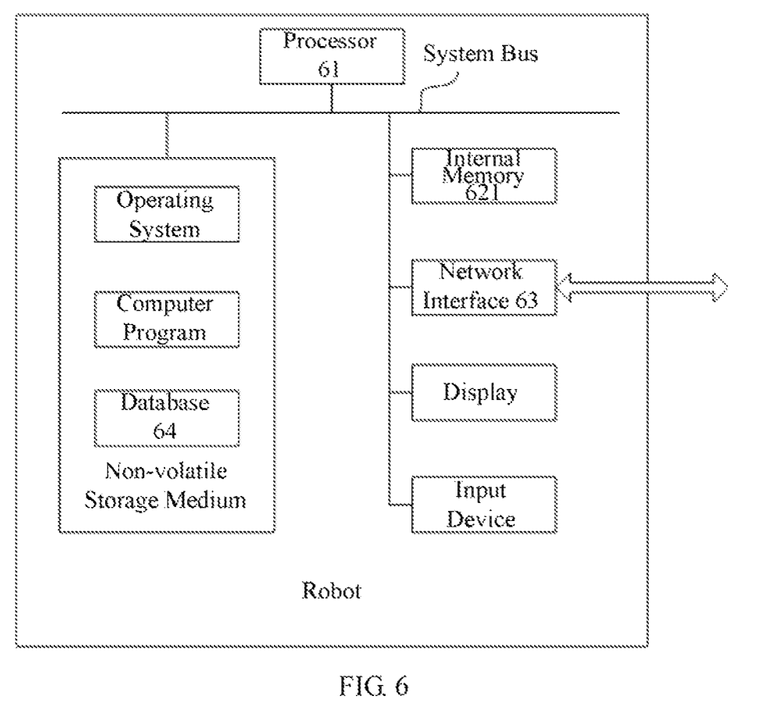
FIG. 6 is a schematic block diagram of a robot according to an embodiment of the present disclosure.

FIG. 6 is a schematic block diagram of a robot according to an embodiment of the present disclosure. A robot is provided. As shown in FIG. 6, the robot includes a processor 61, a storage, a network interface 63, and a database 64 which are connected via a system bus. In which, the processor 61 is for realizing calculations and controls. The storage includes a non-volatile storage medium and an internal memory 621. The non-volatile storage medium stores an operating system, a computer program, and the database 64. The internal memory 621 provides an environment for the execution of the operating system and computer program in the non-volatile storage medium. The database 64 is for storing a robot pose determination program and other data. The network interface 63 is for connecting and communicating with an external terminal via a network. When the computer program is executed by the processor 61, the above-mentioned robot pose determination method is implemented.

Those skilled in the art can understand that, the structure shown in FIG. 6 is only a part of the structure related to the solution of the present disclosure, and does not constitute a limitation on the robot to which the solution of the present disclosure is applied.

In addition, the present disclosure further provides a non-transitory computer-readable storage medium which includes a robot pose determination program. When the robot pose determination program is executed by a processor, the steps of the robot pose determination program as described in the above-mentioned embodiment is implemented. It can be understood that, in this embodiment, the computer-readable storage medium may be a volatile readable storage medium or a non-volatile readable storage medium.

In summary, for the pose determination method, the robot, and the computer readable storage medium provided in the embodiments of the present disclosure, the camera is used to estimate the pose of the robot, and the estimated pose is gradually fused with the fused inertial sensor data and the mileage information to continuously correct the pose of the robot, so that even when in the complex scenes which has complex light and multi dynamic objects, the accurate pose of the robot can still be obtained, thereby improving the accuracy of determining the pose of the robot in the complex scenes.

It can be understood by those skilled in the art that, all or part of the process of the method of the above-mentioned embodiment can be implemented by a computer program to instruct related hardware. The program can be stored in a non-volatile computer readable storage medium. When the program is executed, which can include the process of each method embodiment as described above. In which, any reference to a storage, a memory, a database or other medium used in each embodiment provided by the present disclosure may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. As a description rather than a limitation, RAM can be in a variety of formats such as static RAM (SRAM), dynamic RAM (DRAM), synchronous DRAM (SDRAM), double data rate SDRAM (DDRSDRAM), enhanced SDRAM (ESDRAM), synchronous link DRAM (SLDRAM), rambus direct RAM (RDRAM), direct rambus DRAM (DRDRAM), and rambus DRAM (RDRAM).

It should be noted that, in the present disclosure, the terms "comprise", "include" or any other variants thereof are intended to cover non-exclusive inclusion, so that a process, apparatus (or device), article or method including a series of elements not only includes those elements, but also includes other elements that are not explicitly listed, or elements inherent to the process, apparatus, article, or method. Unless specifically restricted, the element defined by the sentence "including a . . . " does not exclude the existence of other identical elements in the process, apparatus, article, or method that includes the element.

The foregoing are merely the embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented pose determination method for a robot having a camera and a sensor, comprising:
   obtaining a two-dimensional code image collected by the camera of the robot and sensor data collected by the sensor of the robot, and determining mileage information of the robot within a predetermined duration, wherein the sensor data includes an acceleration and an angular velocity, and wherein the two-dimensional code image is an image including at least one two-dimensional code;
   calculating a first pose of the camera based on two-dimensional code information recognized from the two-dimensional code image, and determining a second pose of the sensor based on the sensor data;
   obtaining a third pose by performing a tight coupling optimization based on the first pose and the second pose; and
   obtaining the pose of the robot by fusing the third pose and the mileage information.

2. The method of claim 1, wherein the obtaining the third pose by performing the tight coupling optimization based on the first pose and the second pose comprises:
   obtaining marginalized prior information based on the two-dimensional code image and the sensor data; and
   obtaining the third pose by performing the tight coupling optimization based on the marginalized prior information, the first pose, and the second pose.

3. The method of claim 1, wherein the obtaining the pose of the robot by fusing the third pose and the mileage information comprises:

obtaining the pose of the robot by fusing the third pose and the mileage information using an extended Kalman filter algorithm.

4. The method of claim 3, wherein after the obtaining the pose of the robot by fusing the third pose and the mileage information using an extended Kalman filter algorithm, further comprising:
   adjusting the pose of the robot to a pose of the robot in a global map using an ultra-wideband positioning technology.

5. The method of claim 4, wherein after the adjusting the pose of the robot to a pose of the robot in a global map using an ultra-wideband positioning technology, further comprising:
   obtaining a fourth pose of a two-dimensional code corresponding to the two-dimensional code information relative to the first pose; and
   constructing a global two-dimensional code map by marking the two-dimensional code in the global map based on the fourth pose and the pose of the robot in the global map.

6. The method of claim 1, wherein the determining the mileage information of the robot within the predetermined duration comprises:
   obtaining the mileage information of the robot within the predetermined duration by one of determining using a wheeled odometer and calculating using a positive kinematics method.

7. The method of claim 1, wherein the camera is an infrared camera, and the robot further has an infrared fill light: wherein before the obtaining the two-dimensional code image collected by the camera of the robot and sensor data collected by the sensor of the robot, and determining mileage information of the robot within the predetermined duration, further comprising:
   turning on the infrared fill light in response to detecting that the infrared camera is collecting the two-dimensional code image.

8. A robot, comprising:
   a processor;
   a memory coupled to the processor; and
   one or more computer programs stored in the memory and executable on the processor;
   wherein, the one or more computer programs comprise:
   instructions for obtaining a two-dimensional code image collected by the camera of the robot and sensor data collected by the sensor of the robot, and determining mileage information of the robot within a predetermined duration, wherein the sensor data includes an acceleration and an angular velocity, and wherein the two-dimensional code image is an image including at least one two-dimensional code;
   instructions for calculating a first pose of the camera based on two-dimensional code information recognized from the two-dimensional code image, and determining a second pose of the sensor based on the sensor data;
   instructions for obtaining a third pose by performing a tight coupling optimization based on the first pose and the second pose; and
   instructions for obtaining the pose of the robot by fusing the third pose and the mileage information.

9. The robot of claim 8, wherein the instructions for obtaining the third pose by performing the tight coupling optimization based on the first pose and the second pose comprise:
   instructions for obtaining marginalized prior information based on the two-dimensional code image and the sensor data; and
   instructions for obtaining the third pose by performing the tight coupling optimization based on the marginalized prior information, the first pose, and the second pose.

10. The robot of claim 8, wherein the instructions for obtaining the pose of the robot by fusing the third pose and the mileage information comprise:
    instructions for obtaining the pose of the robot by fusing the third pose and the mileage information using an extended Kalman filter algorithm.

11. The robot of claim 10, wherein the one or more computer programs further comprise:
    instructions for adjusting the pose of the robot to a pose of the robot in a global map using an ultra-wideband positioning technology.

12. The robot of claim 11, wherein the one or more computer programs further comprise:
    instructions for obtaining a fourth pose of a two-dimensional code corresponding to the two-dimensional code information relative to the first pose; and
    instructions for constructing a global two-dimensional code map by marking the two-dimensional code in the global map based on the fourth pose and the pose of the robot in the global map.

13. The robot of claim 8, wherein the instructions for determining the mileage information of the robot within the predetermined duration comprise:
    instructions for obtaining the mileage information of the robot within the predetermined duration by one of determining using a wheeled odometer and instructions for calculating using a positive kinematics method.

14. A non-transitory computer readable storage medium for storing one or more computer programs, wherein the one or more computer programs comprise;
    instructions for obtaining a two-dimensional code image collected by the camera of the robot and sensor data collected by the sensor of the robot, and determining mileage information of the robot within a predetermined duration, wherein the sensor data includes an acceleration and an angular velocity, and wherein the two-dimensional code image is an image including at least one two-dimensional code;
    instructions for calculating a first pose of the camera based on two-dimensional code information recognized from the two-dimensional code image, and determining a second pose of the sensor based on the sensor data;
    instructions for obtaining a third pose by performing a tight coupling optimization based on the first pose and the second pose; and
    instructions for obtaining the pose of the robot by fusing the third pose and the mileage information.

15. The storage medium of claim 14, wherein the instructions for obtaining the third pose by performing the tight coupling optimization based on the first pose and the second pose comprise:
    instructions for obtaining marginalized prior information based on the two-dimensional code image and the sensor data; and
    instructions for obtaining the third pose by performing the tight coupling optimization based on the marginalized prior information, the first pose, and the second pose.

16. The storage medium of claim 14, wherein the instructions for obtaining the pose of the robot by fusing the third pose and the mileage information comprise:

instructions for obtaining the pose of the robot by fusing the third pose and the mileage information using an extended Kalman filter algorithm.

17. The storage medium of claim 16, wherein the one or more computer programs further comprise:
   instructions for adjusting the pose of the robot to a pose of the robot in a global map using an ultra-wideband positioning technology.

18. The storage medium of claim 17, wherein the one or more computer programs further comprise:
   instructions for obtaining a fourth pose of a two-dimensional code corresponding to the two-dimensional code information relative to the first pose; and
   instructions for constructing a global two-dimensional code map by marking the two-dimensional code in the global map based on the fourth pose and the pose of the robot in the global map.

19. The storage medium of claim 14, wherein the instructions for determining the mileage information of the robot within the predetermined duration comprise:
   instructions for obtaining the mileage information of the robot within the predetermined duration by one of determining using a wheeled odometer and instructions for calculating using a positive kinematics method.

20. The method of claim 1, wherein the two-dimensional code information includes four corner pixels of each of the at least one two-dimensional code.

* * * * *